United States Patent [19]

Huignard et al.

[11] Patent Number: 4,592,618
[45] Date of Patent: Jun. 3, 1986

[54] HOLOGRAPHIC RECORDING AND RELATED READING PROCESS

[75] Inventors: Jean-Pierre Huignard; Hervé Arditty, both of Paris, France

[73] Assignee: Thomson CSF, Paris, France

[21] Appl. No.: 394,723

[22] Filed: Jul. 2, 1982

[30] Foreign Application Priority Data

Jul. 7, 1981 [FR] France ............................ 81 13322

[51] Int. Cl.$^4$ .............................................. G42B 5/32
[52] U.S. Cl. ................................ 350/3.61; 350/3.64; 350/3.67; 350/3.81; 350/162.2
[58] Field of Search ............... 350/3.64, 3.77, 3.81, 350/3.67, 3.68, 3.85, 162.2

[56] References Cited

U.S. PATENT DOCUMENTS

| | | | |
|---|---|---|---|
| 3,519,323 | 7/1970 | Collier et al. | 350/3.68 |
| 3,603,668 | 9/1971 | DeBitetto | 350/162.2 |
| 3,617,274 | 11/1971 | Lin | 350/3.61 |
| 3,754,808 | 8/1973 | Clay et al. | 350/3.86 |
| 4,451,114 | 5/1984 | Nicholson et al. | 350/3.81 X |

FOREIGN PATENT DOCUMENTS 2802594 8/1978 Fed. Rep. of Germany ..... 350/3.64

OTHER PUBLICATIONS

Gulanyan et al., "Nondestructive ... Crystals", Sov. J. Quantum Electron., vol. 9, No. 5, May 1979, pp. 647–649.
Huignard and Herriau, "Real-Time ... Configuration", Applied Optics, vol. 16, No. 7, Jul. 1977, pp. 1807–1809.

Primary Examiner—John K. Corbin
Assistant Examiner—William Propp
Attorney, Agent, or Firm—Cushman, Darby & Cushman

[57] ABSTRACT

A holographic process is provided for recording-reading by means of index strata in the volume of a photoexcitable storage medium. This process consists in causing two beams to interfere in this medium during two successive writing steps by using writing radiations of different wavelengths. The reading of this medium is then effected by means of a third coherent radiation having for wave vector in the medium a linear combination of the wave vectors of said writing radiations.

9 Claims, 9 Drawing Figures

HOLOGRAPHIC RECORDING AND RELATED READING PROCESS

BACKGROUND OF THE INVENTION

The invention relates to a holographic recording-reading process and a device for implementing this process.

In known holographic recording-reading devices, the hologram of an object is recorded from an object wave diffracted by the object, the hologram of which it is desired to record, and from a corresponding wave. Materials are at present available for writing phase networks or holograms with high diffraction efficiency such as dichromate gelatine, or for operating in real time with such materials as electro-optical crystals, for instance bismuth-silicon oxide. These materials are "thick" with respect to the mean pitch of the photoinduced strata, and their behavior on writing and reading is described by the formalism of the coupled waves; the angular selectivity Bragg effect may be more especially used.

The reading of holograms is achieved by illumination with coherent optical radiation, e.g. by means of the reference beam which was used for recording. So that this reading does not cause erasure of the written hologram, the previously induced spatial index variation should not be substantially modified by such radiation.

If the object wave is complex and thus contains a set of non-colinear wave vectors, there is formed in the photosensitive support medium a spectrum of resulting vectors having different lengths and orientations. Within the scope of the known art it is then not possible to diffract an image under optimum conditions if the reading wavelength is different from that used for holographic recording in the thick material. This is an important restriction. In fact, for information recorded by photorefractive effect in electro-optical crystals of the bismuth-silicon oxide type (BSO), re-reading at the same wavelength erases the information by relaxation of the space charge field.

If it is a case of non-destructive reading, it may be interesting to read with visible radiation a recording made with smaller wavelengths. Thus, the optical components on dichromate or bleached gelatine have a limited spectral range which goes from about 0.23 micrometers to about 0.58 micrometers, which considerably limits use thereof. The recording method proposed in the present invention provides re-reading, under Bragg conditions, by means of a wavelength chosen outside the spectral sensitivity range of the bismuth-silicon oxide (BSO) type crystals for example.

SUMMARY OF THE INVENTION

The invention provides a holographic process for recording-reading by means of index strata in the volume of a photoexcitable storage medium, consisting in causing, in said volume, a beam coming from an object to interfere with a reference beam during two successive writing steps by using two writing radiations of different wave-lengths produced by two coherent radiation sources and projected in the same way towards said object and towards said medium; the reading of said medium being provided by a third source producing a coherent radiation having for a wave vector in said medium a linear combination of the wave vectors of said writing radiations.

The invention further provides a device for implementing this process.

BRIEF DESCRIPTION OF THE DRAWINGS

Other characteristics and advantages of the invention will appear from the following description with reference to the accompanying figures in which.

DESCRIPTION OF THE PREFERRED EMBODIMENT

The description which follows and the figures considered refer to the inside of medium 1. That is to say that we can write $2\pi n/\lambda = K$ where n is the index of the medium at wavelength $\lambda$ and K the wave vector of the radiation considered.

Figure 1:
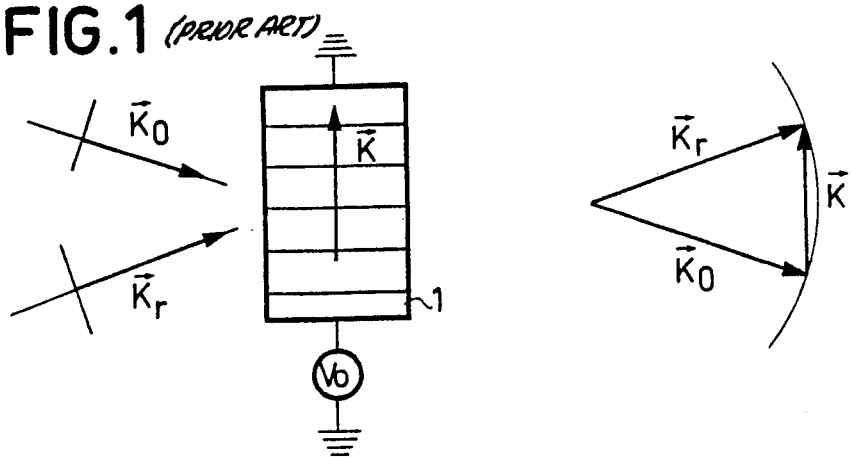
FIGS. 1, 2 and 3 are explanatory figures of the operation of a device of the known art.

In FIG. 1, we consider two beams. A beam modulated by a linearly transparent object of wave vector $\vec{K}_o$ and a reference beam with wave vector $\vec{K}_r$. The interference fringes resulting from this superimposition of the two beams having the same wavelength are recorded in medium 1. This medium, by way of non-limiting example, is formed by a photorefractive material polarized by an electric field obtained by means of a voltage source $V_o$. Its orientation is such that the electric field produces an index variation effect by charge carriers created by photoexcitation. The spatial variations of light intensity result instantaneously in this medium in spatial refraction index variations, the interference planes being preferably substantially perpendicular to the direction of the applied field.

Figure 2:
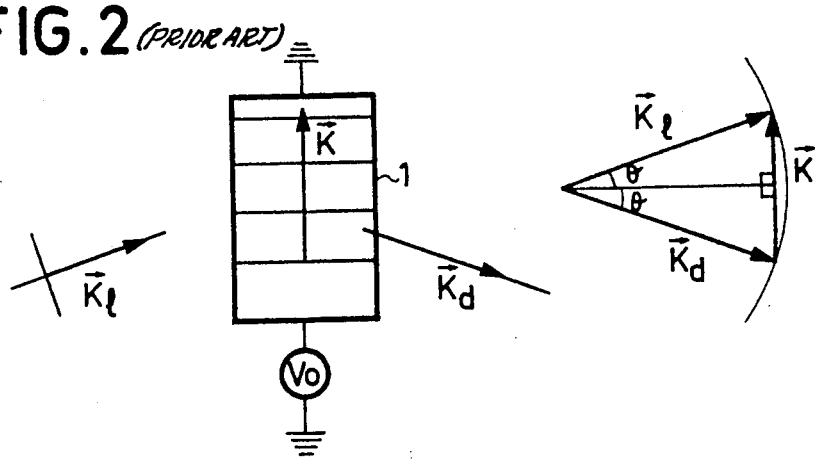

There is then created a strata network with spatial wave vector $\vec{K}:/\vec{K}/=(2\pi/\Lambda)$ with $\Lambda$ equal to the pitch of the photoinduced strata. It is known that the three vectors thus defined are related by the vectorial relationship: $\vec{K} = \vec{K}_r - \vec{K}_o$ which is illustrated in FIG. 1. During reading, with the reading beam of wave vector $\vec{K}_l$, so as to obtain optimum efficiency of the diffraction, Bragg's condition should be respected which defines, for each interference system, the angle $\theta$ between this parallel reading beam and the diffraction planes. Thus, a diffracted wave with wave vector $\vec{K}_d$ is obtained. As is shown in FIG. 2, these different vectors are related by the relationship: $\vec{K}_d = \vec{K}_l - \vec{K}$.

These vectorial relationships allows Bragg's incidence of the reading beam to be calculated if the wavelength of this latter $\lambda'$ is different from that used for writing the network $\lambda$. We have: $\sin \theta = (\lambda/2\Lambda)$, $\theta$ being the adequate angle at wavelength $\lambda$ and $\Lambda$ the pitch of the photoinduced strata, we have similarly $\sin \theta' = (\lambda'/2\Lambda)$.

Figure 3:
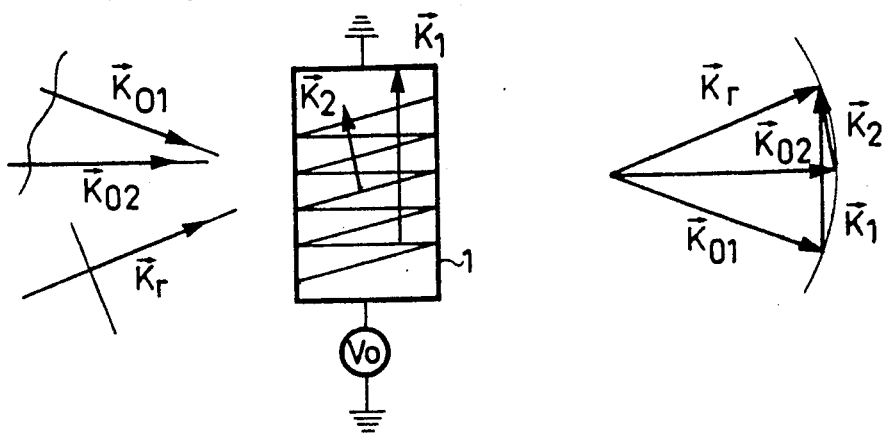

As in FIG. 3, if the object wave used is complex, it contains a set of wave vectors, here $\vec{K}_{o1}$ and $\vec{K}_{o2}$, and there results in the photosensitive medium 1 a resulting spectrum of wave vectors $\vec{K}_i$ of different length and orientation; here $\vec{K}_1$ and $\vec{K}_2$ such that $\vec{K}_1 = \vec{K}_r - \vec{K}_{o1}$ and $\vec{K}_2 = \vec{K}_r - \vec{K}_{o2}$. Thus, in the case where the reading wave and the reference wave do not have wave vectors such as $\vec{K}_l = \vec{K}_r$, an image will not be able to be diffracted under optimum conditions if the reading wavelength is different from that used for holographic writing in this thick medium. In fact, in this case, we have $\theta' \neq \theta$ with $\sin \theta' = (\lambda'/\lambda) \sin \theta$.

The process of the invention provides re-reading, under Bragg's conditions, by means of a reading wave having a wavelength $\lambda_l$ different from the wavelength of the reference beam, chosen outside the spectral sensitivity field of the BSO crystals for example.

This re-reading is possible in volume, for the same conditions for illuminating the object are adopted, during two successive recordings, so that the radiations which interfere in the medium give to the strata identical orientations but spaced apart by distances which vary as a function of the wavelengths used.

Figure 4:
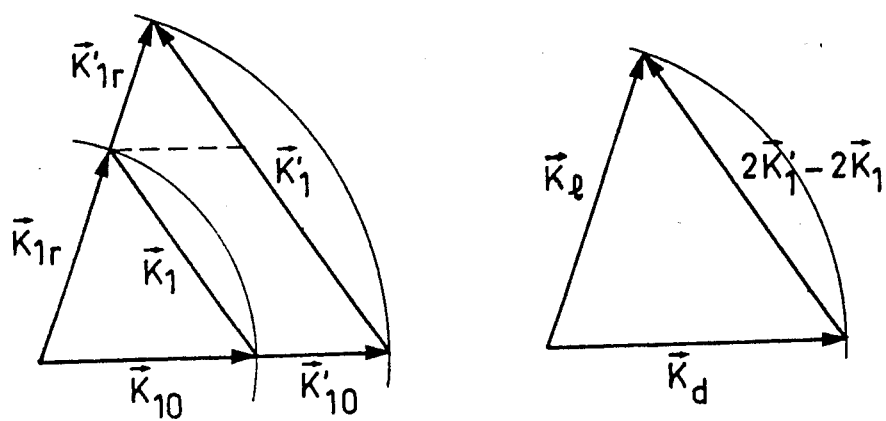
FIGS. 4, 5, 6a and 6b are explanatory figures of the process of the invention.
Figure 5:
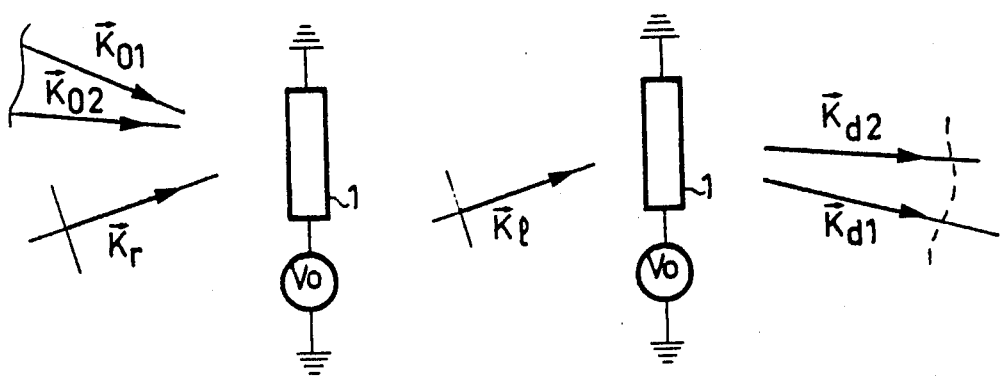

With this being stated, the process of the invention is based on the non-linearities induced by the diffraction of a phase structure recorded at two wavelengths $\lambda_1$ and $\lambda'_1$; as illustrated in FIG. 4, if we consider a flat object wave front, to these two wavelengths there correspond two colinear wave vectors $\vec{K}_{10}$ and $\vec{K}_{10}'$, the same goes for reference wave vectors $\vec{K}_{1r}$ and $\vec{K}_{1r}'$. Thus, the resulting vectors $\vec{K}_1$ and $\vec{K}_1'$ are homothetic with respect to each other, these two wave vectors representative of the strata network are then parallel: $\vec{K}'_1 = k\vec{K}_1$.

If we consider a light intensity $I_1$ for recording, it may be broken down into a mean amplitude component $I_o$ and a sinusoidal component $I_{m1}$. If $\vec{r}$ is the original unit position vector, at any point in the medium, we have: $\vec{r} = \vec{ix} + \vec{jy} + \vec{kz}$ (i,j,k being the unit vectors directed along axes x,y,z respectively), we have $I_1 = I_o + I_{m1} \cos(\vec{K}_1 \cdot \vec{r} + \alpha)$. We may consider $I_o = I_{m1}$ and the arbitrary phase constant $\Delta = 0$.

Thus, $I_1 = I_o + I_o \cos(\vec{K}_1 \cdot \vec{r})$.

If we consider the vector i for example colinear with $\vec{K}_1$ we have: $\vec{K}_1 \cdot \vec{r} = /\vec{K}_1 //\vec{i}/$.

Thus $I_1 = I_o + I_o \cos/\vec{K}_1 //\vec{i}/$.

If we consider two parallel vectors $\vec{K}_1$ and $\vec{K}_1'$, their respective light intensities have the same form and we have the resulting intensity:

$$I = I_1 + I_1' = 2I_o + I_o \cos/\vec{K}_1 //\vec{i}/ + I_o \cos/\vec{K}'_1 //\vec{i}/.$$

The refraction index variation is linearly proportional to the exposure, so the refraction index may be expressed in a form similar to that of the light intensity.

But the materials considered are not sensitive to the continuous component, they are sensitive to the index gradient so:

$$\Delta n = \Delta n_o + \cos/\vec{K}_1 //\vec{i}/ + \cos/\vec{K}'_1 //\vec{i}/.$$

Figure 6A:
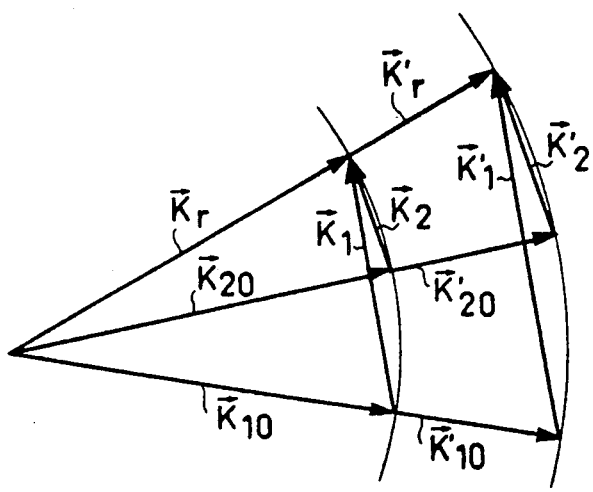
Figure 6B:
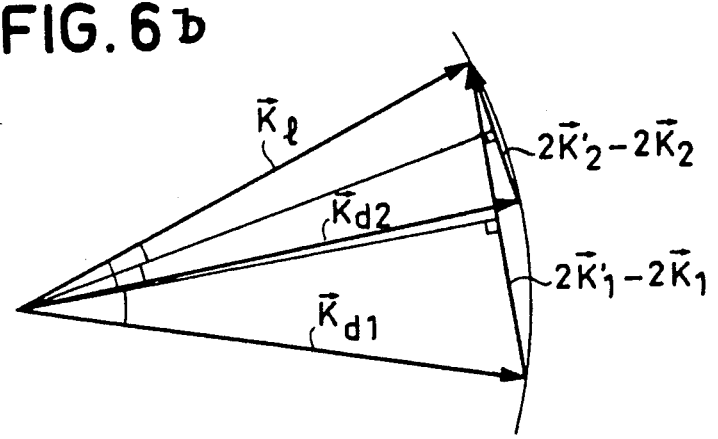

The phase modulation on the reading wave depends on the resulting illumination, so it may be expressed in the form:

$$a = A_o e^{j\omega_o t} e^{j\Delta\phi_o(\cos/\vec{K}_1 //\vec{i}/ + \cos/\vec{K}'_1 //\vec{i}/)}$$

with $e^{j\Delta\phi_o \cos Kx} = \sum_{n=-\infty}^{n=\infty} j^n J_n(\Delta\phi_o) e^{jnKx}$ This breakdown into Bessel's function shows that if two wave vectors $\vec{K}_1$ and $\vec{K}'_1$ are recorded in the medium, there is generated by non linear interaction at reading:

$\vec{K}_1 \pm \vec{K}'_1$ $2\vec{K}_1 \pm 2\vec{K}'_1$ $2\vec{K}'_1 \pm \vec{K}_1$ $2\vec{K}_1 \pm \vec{K}'_1$ One or other of these wave vectors will allow diffraction in the medium with Bragg conditions for the reading wavelength $\lambda_l$ such that, if we take the case of vector $\vec{K}_{il} = 2\vec{K}'_1 - 2\vec{K}_1$ which is the case considered in FIG. 6, we have $= 2\pi(n_e/\lambda_1) = 2\pi((2n'_1/\lambda'_1) - (2n_1/\lambda_1))$, $n_i$ being the index of the medium at wavelength $\lambda_i$ in a vacuum and the wavelength in the medium being $\lambda_i/n_1$. This FIG. 6 illustrates the process of the invention. The recording takes place in two successive phases with two separate wavelengths: at one wavelength $\lambda_1$ for which we have the vectors $\vec{K}_r$, $\vec{K}_{10}$ and $\vec{K}_{20}$ whose ends are then on a circle and at another wavelength $\lambda'_1$: $\vec{K}'_r$, $\vec{K}'_{10}$ and $\vec{K}'_{20}$. The resulting vectors are homothetic, i.e. $\vec{K}'_1 = k\vec{K}_1$ and $\vec{K}'_2 = k\vec{K}_2$. By the previously made demonstration, there then exist in addition to the elementary strata networks a series of possible configurations of resulting vectors $\vec{K}_{i1}$ and $\vec{K}_{i2}$ corresponding to the combination of vectors $\vec{K}_1$ and $\vec{K}'_1$ and $\vec{K}_2$ and $\vec{K}'_2$ in the form $a\vec{K}_1 + b\vec{K}'_1$, and $a\vec{K}_2 + b\vec{K}'_2$; a and b being positive or negative integers. Now, each of the resulting vectors $\vec{K}_{i1}$ $\vec{K}_{i2}$ is homothetic with the vectors $\vec{K}_1$ and $\vec{K}_2$, in fact $\vec{K}_{i1} = a\vec{K}_1 + b\vec{K}'_1 = \vec{K}_1(a+bk)$ and $\vec{K}_{i2} = a\vec{K}_2 + b\vec{K}'_2 = \vec{K}_2 = \vec{K}_2(a+bk)$.

These different forms are also valid with a greater number of wave vectors of the complex wave beam modulated by the object. Thus, reading at Bragg's incidence may be carried out and this in a direction parallel to the direction of the reference beam because of this homothetic relationship linking the vectors $\vec{K}_{i1}$ and $\vec{K}_1$, and $\vec{K}_{i2}$ and $\vec{K}_2$. In FIG. 6, we have then taken $a = 2$ and $b = -2$.

The ends of vectors $\vec{K}_l$ (wave vector of the reading beam, and $\vec{k}_{d1}$ and $\vec{k}_{d2}$: wave vectors of the diffraction beams corresponding to wave vectors $\vec{K}_{o1}$ and $\vec{K}_{o2}$) are on the same circle because of Bragg's incidence, $\vec{K}_l$ being parallel to $\vec{K}_r$.

Reading takes place at a new wavelength such as previously defined.

The whole of the preceding description and the accompanying figures relate to the inside of medium 1. But these figures as well as the formulae remain valid outside the medium, providing however that a medium is considered whose index varies little for the wave lengths considered, for example to within $10^{-3}$. This is true for low dispersion materials which is the case for gelatine. For materials such as BSO, the index variation due to dispersion may be compensatted for by the addition of two transparent passive plates 2 having an index variation opposite that of medium 1 and surrounding this latter, so as to compensate for the chromatism which exists in this medium. This may be perfectly well accomplished by a network, for example.

Figure 7A:
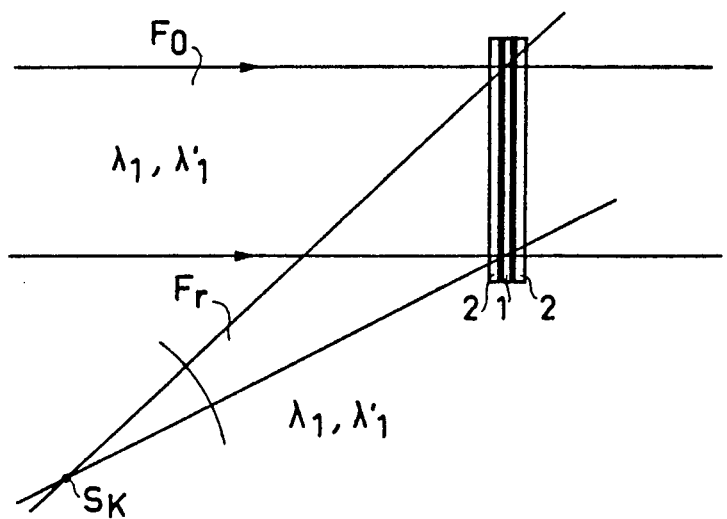
FIGS. 7a and 7b illustrate the process of the invention.
Figure 7B:
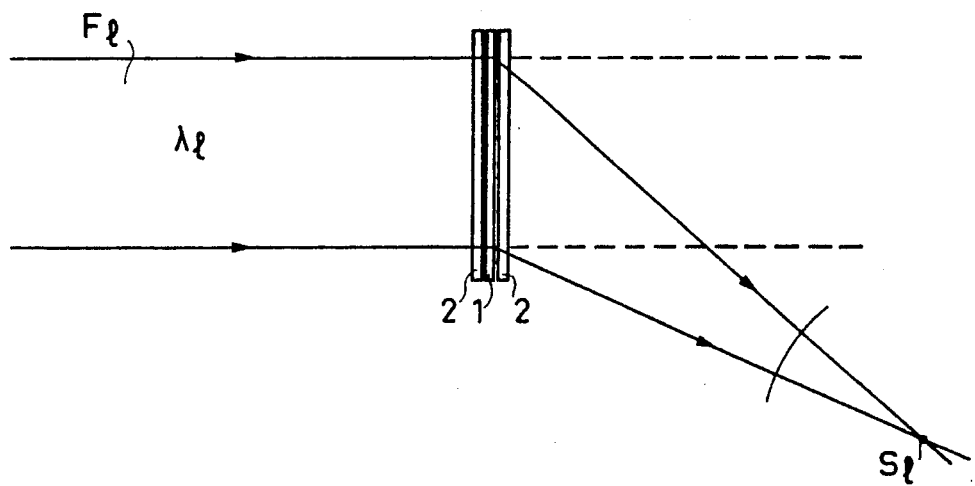

FIG. 7 shows an example of operation with the two wavelengths $\lambda_1$ and $\lambda'_1$.

The composition diagram for the wave vectors is maintained whatever the orientation of one of the wave vectors $\vec{K}_1$ for example, a complex image is then diffracted as a whole with wavelength change between writing and reading. By way of example, we may consider the non-destructive reading of a volume hologram recorded in a BSO crystal.

A reading wavelength (laser semiconductor) of 800 nm $< \lambda_l <$ 1000 nm is considered; $n_l = 2.45$ and writing wavelengths
$\lambda_1 = 450$ nm; $n_1 = 2.7$ $\lambda'_1 = 550$ nm; $n'_1 = 2.6$ That is $\lambda_l = n_1 (\lambda_1 \lambda'_1/2(n_1 \lambda'_1 - n'_1 \lambda_1)) = 962.5$ nm in the previously considered case.

We than have $\lambda_l = 962.5$ nm as reading wavelength.

By choosing a pair of blue-green writing wavelengths, we may then read again the information in a non-destructive way by means of a semiconductor laser emitting in the infrared. The recording wavelengths are for example obtained from a Krypton, He-Se laser or a colored laser.

Thus, the device proposed provides diffraction of a thick phase structure for any visible or infrared reading wavelength.

Thus, the applications of this invention are to be found in the field of holographic optical components recorded by index variation on support media of the "gelatine" type; the invention presents a great advantage also in the non-destructive reading (outside the absorption band) of information recorded by photorefractive effect in BSO crystals for example (recording close to the absorption band).

What is claimed is:

1. A process for recording a holographic image of an object applicable to a volume-type non-linear photoexcitable storage medium, comprising the steps of:

first recording in said medium interference patterns generated by the combination of a first incident light beam from said object and a first reference light beam, both of said first beams being of a first wavelength; and second recording in said medium interference patterns generated by the combination of a second incident light beam from said object and a second reference light beam, both of said second beams being of a second wavelength differing from said first wavelength and having identical projections as said respective first beams, thereby obtaining a non-linear mixing of said recorded interference patterns in said medium defining a holographic recording of said object.

2. A process as in claim 1 further comprising the step reading all interference patterns written in said medium with a third wavelength which is defined by said first and second wavelengths.

3. A process as in claim 2, wherein said third wavelength is defined by its relation to the first and second wavelengths in accordance with the following:

$$\lambda_3 = (n_1 \lambda_1 \lambda_2 / 2(n_1 \lambda_2 - n_2 \lambda_1))$$

with $\lambda_1$, $\lambda_2$ and $\lambda_3$ representing said first through third wavelengths, respectively and $n_1$ and $n_2$ representing the refractive index of said medium at said first and second wavelengths, respectively.

4. A process for recording and reading a holographic image of an object utilizing index strata in a volume non-linear photexcitable storage medium, comprising the steps of:

recording in said medium a pattern of interference of a light beam reflected from said object and a reference light beam in successive writing radiations of respective two different wavelengths to thereby obtain a non-linear mixing of said recorded interference patterns in said medium defining a holographic recording of said object, said successive radiations being projected identically on said object and on said medium; and reading from said medium the interference pattern so recorded by irradiating said medium with a source of coherent radiation having a third wavelength distinct from said two different wavelengths to produce a holographic image of said object.

5. A process as in claim 4, wherein said reading step further includes the step of defining said third wavelength by a linear combination of said two different wavelengths.

6. A process as in claim 5, wherein said linear combination is defined by the relationship:

$$\lambda_3 = (n_1 \lambda_1 \lambda_2 / 2(n_1 \lambda_2 - n_2 \lambda_1)),$$

where $\lambda_1$ and $\lambda_2$ are the respective wavelengths of said two different wavelengths, $n_1$ and $n_2$ are respectively the refractive index of said medium at $\lambda_1$ and $\lambda_2$, and $\lambda_3$ is said third wavelength.

7. A process as in claim 4, wherein said reading step is non-destructive.

8. A process as in claim 4 further comprising the step of:

compensating inherent chromatism existing in said medium with index variation correction.

9. A process as in claim 8, wherein said compensating step includes the step of providing two transparent plates of an index variation opposite that of said storage medium, and surrounding said medium with said two plates.

* * * * *